US006413899B1

(12) United States Patent
Dolle et al.

(10) Patent No.: US 6,413,899 B1
(45) Date of Patent: Jul. 2, 2002

(54) 1-OLEFIN ISOBLOCK POLYMER AND PROCESS FOR ITS MANUFACTURE

(75) Inventors: Volker Dolle, Kelkheim; Jürgen Rohrmann, Liederbach; Andreas Winter, Kelkheim; Martin Antberg, Hofheim am Taunus; Robert Klein, Frankfurt am Main, all of (DE)

(73) Assignee: Basell Polyolefine GmbH (DE)

( * ) Notice: Subject to any disclaimer, the term of this patent is extended or adjusted under 35 U.S.C. 154(b) by 0 days.

(21) Appl. No.: 08/462,909

(22) Filed: Jun. 5, 1995

Related U.S. Application Data

(63) Continuation of application No. 07/747,350, filed on Aug. 20, 1991, now abandoned, which is a continuation of application No. 07/387,350, filed on Jul. 28, 1989, now abandoned.

(30) Foreign Application Priority Data

Jul. 30, 1988 (DE) .......................... 38 26 075

(51) Int. Cl.⁷ .................................. B01J 3/14
(52) U.S. Cl. ...................... 502/103; 502/102; 526/128; 526/943; 526/348.2; 526/348.5; 526/348.6; 526/159; 526/160
(58) Field of Search .............................. 556/11, 27, 43, 556/52, 53; 526/128, 943, 348.2, 348.5, 348.6, 159, 160; 502/103, 102

(56) References Cited

U.S. PATENT DOCUMENTS

| 4,522,982 A | | 6/1985 | Ewen |
| 4,542,199 A | | 9/1985 | Kaminsky et al. |
| 4,769,510 A | * | 9/1988 | Kaminsky et al. .......... 526/160 |
| 4,794,096 A | * | 12/1988 | Ewen ........................ 526/160 |
| 4,841,004 A | | 6/1989 | Kaminsky et al. |
| 4,849,487 A | * | 7/1989 | Kaminsky et al. .......... 526/160 |
| 5,017,714 A | | 5/1991 | Welborn, Jr. |
| 5,416,178 A | | 5/1995 | Winter et al. |

FOREIGN PATENT DOCUMENTS

| CA | 1 209 123 | 8/1986 |
| CA | 1 326 676 | 2/1994 |
| EP | 0 069 951 | 1/1983 |
| EP | 129 368 | 12/1984 |
| EP | 0 185 918 | 7/1986 |
| EP | 0 269 986 | 6/1988 |
| EP | 0 269 987 | 6/1988 |
| EP | 0 302 424 | 2/1989 |
| EP | 0 344 887 | 12/1989 |

OTHER PUBLICATIONS

P. Jutzi et al.; "Metallkomplexe mit Verbrückten Permethylierten Cyclopentadienylliganden", Chem. Ber. 119; 1986; pp. 1750–1754.

* cited by examiner

*Primary Examiner*—Donald R. Wilson
*Assistant Examiner*—William K. Cheung
(74) *Attorney, Agent, or Firm*—Connolly Bove Lodge & Hutz LLP

(57) ABSTRACT

Isoblock polymers of 1-olefins with a narrow molecular weight distribution are obtained when 1-olefins are polymerized using a catalyst consisting of a chiral metallocene, containing bridges, of formula I:

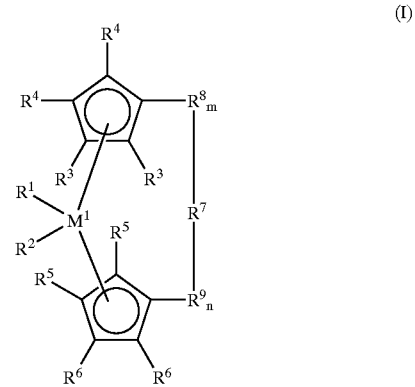

and an aluminoxane. The polymers have rubber-like properties.

17 Claims, No Drawings

1-OLEFIN ISOBLOCK POLYMER AND PROCESS FOR ITS MANUFACTURE

This application is a continuation of application Ser. No. 07/747,350 filed Aug. 20, 1991, abandoned which is a continuation of Ser. No. 07/387,350 filed Jul. 28, 1989 abondoned.

DESCRIPTION

The invention relates to a 1-olefin isoblock polymer with long isotactic sequences and to a process for its manufacture.

It is known that polypropylene exists in various structural isomers:

(a) highly isotactic polypropylene in whose molecular chains almost all tertiary C atoms have the same configuration,
(b) isotactic stereoblock PP in whose molecular chains isotactic blocks of opposite configuration alternate regularly with one another,
(c) syndiotactic polypropylene in whose molecular chains every other tertiary C atom has the same configuration,
(d) atactic polypropylene in whose molecular chains the tertiary C atoms have a random configuration, and
(e) atactic-isotactic stereoblock PP in whose molecular chains isotactic and atactic blocks alternate with one another.

A process for the manufacture of isotactic stereoblock polymers is known in which propylene is polymerized with the aid of a metallocene of a metal of group IVb, Vb or VIb of the periodic table (q.v. U.S. Pat. No. 4,522,982). This metallocene is a mono-, di- or tri-cyclopentadienyl or substituted cyclopentadienyl compound of a metal, especially titanium. An aluminoxane is used as cocatalyst.

However, the titanocenes which are preferably used do not have sufficient heat stability in dilute solution to be usable in an industrial process. Moreover, in this process, products with longer isotactic sequences (n greater than 6) are only obtained at very low temperature (−60° C.). Finally, the cocatalysts must be used in comparatively high concentration in order to achieve an adequate catalytic yield, so the catalyst residues contained in the polymer product have to be removed in a separate purification step.

It is further known that stereoblock polymers of 1-olefins with long isotactic sequences can be obtained at industrially favorable polymerization temperatures by means of a catalyst consisting of a metallocene compound with cyclopentadienyl radicals substituted by chiral groups, and of an aluminoxane (q.v. European patent application A 269987).

It is further known that stereoblock polymers of 1-olefins with a broad monomodal or multimodal molecular weight distribution can be obtained when 1-olefins are polymerized using a catalyst consisting of a chiral metallocene containing bridges and of an aluminoxane (q.v. European patent application A 269986). The polymers are particularly suitable for the production of transparent sheets.

It is also known that when a catalyst based on bis-cyclopentadienyl compounds of zirconium and on an aluminoxane is used in the polymerization of propylene, only atactic polymer is obtained (q.v. European patent application A 69951).

Finally, highly isotactic polypropylene can be manufactured by means of soluble stereorigid chiral zirconium compounds (q.v. European patent application A 185 918).

A polymerization process has been found in which a polymer of regular molecular structure and high molecular weight is obtained in high yield at industrially favorable process temperatures.

The invention thus relates to an isoblock polymer of a 1-olefin of the formula $RCH=CH_2$, in which R is an alkyl radical having 1 to 28 C atoms, with molecular chains containing isotactic sequences which are separated from one another in each case by one monomer unit of opposite configuration, and with a sequence length of 3 to 50 monomer units.

The invention further relates to a process for the manufacture of the above-mentioned isoblock polymer by the polymerization of a 1-olefin of the formula $RCH=CH2$, in which R is an alkyl radical having 1 to 28 C atoms, at a temperature of −60 to 100° C. and a pressure of 0.5 to 100 bar, in solution, in suspension or in the gas phase, in the presence of a catalyst consisting of a metallocene and an aluminoxane, wherein the metallocene is a compound of formula I:

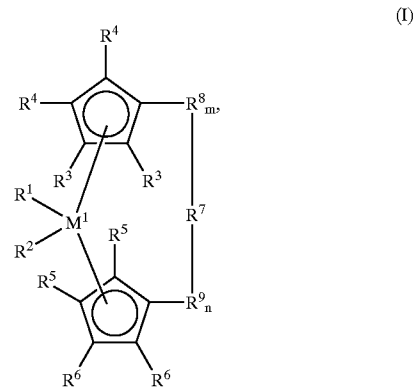

in which $M^1$ is a metal of group IVb, Vb or VIb of the periodic table, $R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-arylalkyl group, a $C_7$–$C_{40}$-alkylaryl group, a $C_8$–$C_{40}$-arylalkenyl group or a halogen atom, $R^3$, $R^4$, $R^5$ and Re are identical or different and are a hydrogen atom, a halogen atom, a $C_1$–$C_{10}$-alkyl group, $-NR^{10}_2$, $-SR^{10}$, $-OSi_rR^{10}_{3r+1}$, $-Si_rR^{10}_{3r+1}$ or $-PR^{10}_2$, in which $R^{10}$ is a halogen atom or a $C_1$–$C_{10}$-alkyl group, or pairs of adjacent radicals $R^3$, $R^4$, $R^5$ and $R^6$ form a ring with the C atoms to which they are bonded, and $R^7$ is

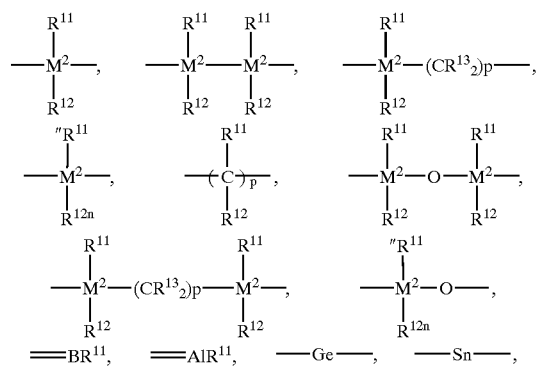

-continued

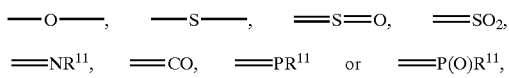

in which
R$^{11}$, R$^{12}$ and R$^{13}$ are identical or different and are a hydrogen atom, a halogen atom, a C$_1$–C$_{10}$-alkyl group, a C$_1$–C$_{10}$-fluoroalkyl group, a C$_6$–C$_{10}$-aryl group, a C$_6$–C$_{10}$-fluoroaryl group, a C$_1$–C$_{10}$-alkoxy group, a C$_2$–C$_{10}$-alkenyl group, a C$_7$–C$_{40}$-arylalkyl group, a C$_8$–C$_{40}$-arylalkenyl group or a C$_7$–C$_{40}$-alkylaryl group, or R$^{11}$ and R$^{12}$ or R$^{11}$ and R$^{13}$ form a ring with the atoms to which they are bonded,
M$^2$ is silicon, germanium or tin,
p is 1, 2 or 3,
R$^8$ and R$^9$ are identical or different and are a group=CR$^{11}$R$^{12}$, in which R$^{11}$ and R$^{12}$ are as defined above, and
m and n are identical or different and are zero, 1 or 2, m+n being zero, 1 or 2.

The isoblock polymer according to the invention is a polymer of a 1-olefin of the formula R-CH=CH2, in which R is an alkyl radical having 1 to 28 C atoms, preferably 1 to 10 C atoms, in particular one C atom, for example propylene, but-1-ene, hex-1-ene, 4-methylpent-1-ene or oct-1-ene. The polymer is especially a propylene polymer.

The molecular chains of this polymer contain isotactic sequences which are separated from one another in each case by one monomer unit of opposite configuration. The molecular chains preferably consist of isotactic sequences which are separated from one another in each case by one monomer unit of opposite configuration. The isotactic sequences have an average length of 3 to 50 monomer units.

As a consequence of this steric structure, the isoblock polymers according to the invention are amorphous or partly crystalline according to the molecular weight and the length of the isotactic sequences. Depending on the crystallinity, the polymers are obtained as granular powders or as compact masses. The partly crystalline isoblock polymers have a low melting point by comparison with isotactic polymers. Isoblock polymers possess rubber-like properties.

The catalyst to be used for the process according to the invention consists of a metallocene compound of formula I and an aluminoxane. In formula I:

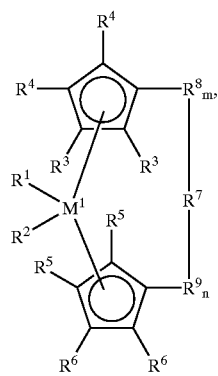

(I)

M$^1$ is a metal of group IVb, Vb or VIb of the periodic table, for example titanium, zirconium, hafnium, vanadium, niobium, tantalum, chromium, molybdenum or tungsten, preferably zirconium or hafnium. R$^1$ and R$^2$ are identical or different and are a hydrogen atom, a C$_1$–C$_{10}$-, preferably C$_1$–C$_3$-alkyl group, a C$_1$–C$_{10}$-, preferably C$_1$–C$_3$-alkoxy group, a C$_8$–C$_{10}$-, preferably C$_6$–C$_8$-aryl group, a C$_6$–C$_{10}$-, preferably C$_6$–C$_8$-aryloxy group, a C$_2$–C$_{10}$-, preferably C$_2$–C$_4$-alkenyl group, a C$_7$–C$_{40}$-, preferably C$_7$–C$_{10}$-arylalkyl group, a C$_7$–C$_{40}$-, preferably C$_7$–C$_{12}$-alkylaryl group, a C$_8$–C$_{40}$-, preferably C$_8$–C$_{12}$-arylalkenyl group or a halogen atom, preferably chlorine.

R$^3$, R$^4$, R$^5$ and R$^6$ are identical or different, preferably different, and are a hydrogen atom, a halogen atom, preferably a fluorine, chlorine or bromine atom, a C$_1$–C$_{10}$-, preferably C$_1$–C$_3$-alkyl group, —NR$^{10}$$_2$, —SR$^{10}$, —OSi$_r$R$^{10}$$_{3r+1}$, —Si$_r$R$^{10}$$_{3r+1}$ or —PR$^{10}$$_2$, in which R$^{10}$ is a halogen atom, preferably a chlorine atom, or a C$_1$–C$_{10}$-, preferably C$_1$–C$_3$-alkyl group, or pairs of adjacent radicals R$^3$, R$^4$, R$^5$ and R$^6$ form a ring with the C atoms to which they are bonded.

R$^7$ is

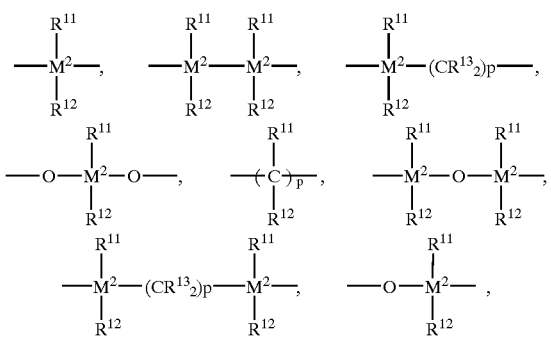

=BR$^{11}$, =AlR$^{11}$, —Ge—, —Sn—, —O—, —S—, =S=O, =SO$_2$, =NR$^{11}$, =CO, =PR$^{11}$ or =P(O)R$_{11}$, in which R$^{11}$, R$^{12}$ and R$^{13}$ are identical or different and are a hydrogen atom, a halogen atom, a C$_1$–C$_{10}$-alkyl group, preferably a C$_1$–C$_4$-alkyl group, especially a methyl group, a C$_1$–C$_{10}$-fluoroalkyl group, preferably a CF$_3$ group, a C$_8$–C$_{10}$-, preferably C$_6$–C$_8$-aryl group, a C$_8$–C$_{10}$-fluoroaryl group, preferably a hexafluorophenyl group, a C$_1$–C$_{10}$-, preferably C$_1$–C$_4$-alkoxy group, especially a methoxy group, a C$_2$–C$_{10}$-, preferably C$_2$–C$_4$-alkenyl group, a C$_7$–C$_{40}$-, preferably C$_7$–C$_{10}$-arylalkyl group, a C$_8$–C$_{40}$-, preferably C$_8$–C$_{12}$-arylalkenyl group or a C$_7$–C$_{40}$-, preferably C$_7$–C$_{12}$-alkylaryl group, or R$^{11}$ and R$^{12}$ or R$^{11}$ and R$^{13}$ form a ring together with the atoms to which they are bonded.

M$^2$ is Si, Ge or Sn and p is 1, 2 or 3.
R$^7$ is preferably =SiR$^{11}$R$^{12}$, =GeR$^{11}$R$^{12}$, —S—, =S=O or =PR$^{11}$.
R$^8$ and R$^6$ are identical or different and are a group =CR$^{11}$R$_{12}$, in which R$^{11}$ and R$^{12}$ are as defined above. =PR$^{11}$.
m and n are identical or different and are zero, 1 or 2, m+n being zero, 1 or 2. m and n are preferably zero or 1.

The metallocenes described above can be prepared according to the following reaction scheme:

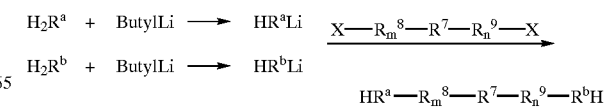

(X=Cl, Br, I, O-Tosyl, HR$^a$

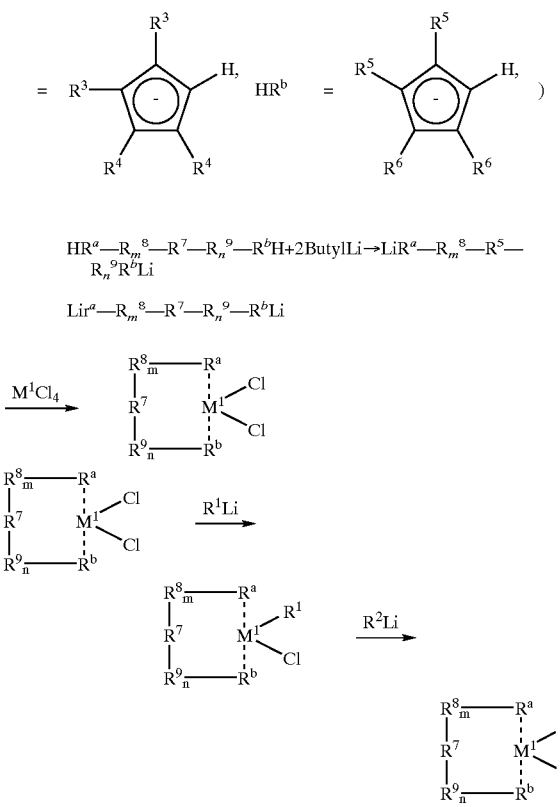

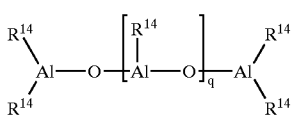

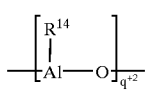

It is especially preferred to use indenyl(h5-cyclopentadienyl) (dimethylsilyl)hafnium dichloride (=1) and indenyl(h5-cyclopentadienyl)(dimethylsilyl)zirconium dichloride (=2) as the metallocene compounds.

The activator is an aluminoxane of formula (II):

$$R^{14}\diagdown_{Al-O-}\underset{R^{14}}{\overset{\left[\begin{array}{c}R^{14}\\|\\Al-O\end{array}\right]_{q}}{\Big|}}Al\diagup^{R^{14}}_{R^{14}} \quad (II)$$

for the linear type and/or of formula (III):

$$-\left[\begin{array}{c}R^{14}\\|\\Al-O\end{array}\right]_{q+2}- \quad (III)$$

for the cyclic type. In these formulae, $R^{14}$ is a $C_1$–$C_6$-alkyl group, preferably methyl, ethyl or isobutyl, in particular methyl, and q is an integer from 2 to 50, preferably 10 to 40. However, the exact structure of the aluminoxane is not certain.

The aluminoxane can be prepared in a variety of ways.

One possibility is carefully to add water to a dilute solution of an aluminum trialkyl, the aluminum trialkyl solution and the water each being introduced in small portions into a larger amount of an inert solvent and the evolution of gas being allowed to finish between successive additions.

In another process, finely powdered copper sulfate pentahydrate is suspended in toluene and, in a glass flask.

aluminum trialkyl is added, under inert gas at about –20° C., in an amount such that about 1 mol of $CuSO_4.5H_2O$ is available for every 4 Al atoms. After slow hydrolysis with the elimination of alkane, the reaction mixture is left for 24 to 48 hours at room temperature, during which time it must be cooled, if necessary, to prevent the temperature from rising above 30° C. The aluminoxane dissolved in the toluene is then isolated from the copper sulfate by filtration and the solution is concentrated under vacuum. It is assumed that, in this preparative process, the low-molecular aluminoxanes condense to form higher-molecular oligomers with the elimination of aluminum trialkyl.

Furthermore, aluminoxanes are obtained when aluminum trialkyl, preferably aluminum trimethyl, dissolved in an inert aliphatic or aromatic solvent, preferably heptane or toluene, is reacted, at a temperature of –20 to 100° C., with aluminum salts containing water of crystallization, preferably aluminum sulfate. The volume ratio of solvent to aluminum alkyl used is 1:1 to 50:1—preferably 5:1—and the reaction time, which can be monitored by means of the alkane eliminated, is 1 to 200 hours—preferably 10 to 40 hours.

Aluminum salts containing water of crystallization which are used in particular are those with a high content of water of crystallization. Aluminum sulfate hydrates are especially preferred, in particular the compounds $Al_2(S)_4)_3.16H_2O$ and $Al_2(SO_4)_3.18H_2O$ with the especially high contents of water of crystallization of 16 and 18 mol of $H_2O$/mol of $Al_2(SO_4)_3$ respectively.

Another variant for the preparation of aluminoxanes consists in dissolving aluminum trialkyl, preferably aluminum trimethyl, in the suspending agent, preferably in the liquid monomer or in heptane or toluene, previously placed in the polymerization kettle, and then reacting the aluminum compound with water.

There are other processes for the preparation of aluminoxanes which can be used in addition to those described above.

Before it is used in the polymerization reaction, the metallocene can be preactivated with an aluminoxane of formula (II) and/or (III), which markedly increases the polymerization activity.

The preactivation of the transition metal compound is carried out in solution, the metallocene preferably being dissolved in a solution of the aluminoxane in an inert hydrocarbon. An aliphatic or aromatic hydrocarbon is suitable for this purpose. Toluene is preferably used. The concentration of the aluminoxane in the solution is in the range from approx. 1% by weight to the saturation limit, preferably from 5 to 30% by weight, based in each case on the total solution. The metallocene can be used in the same concentration, although it is preferably used in an amount of $10^{-4}$–1 mol per mol of aluminoxane. The preactivation time is 5 minutes to 60 hours, preferably 5 to 60 minutes. The reaction temperature is –78° C. to 100° C., preferably 0 to 70° C.

The catalyst to be used according to the invention is employed for the polymerization of 1-olefins of the formula R—CH=$CH_2$, in which R is an alkyl radical having 1 to 28 C atoms, preferably 1 to 10 C atoms, in particular one C atom, for example propylene, but-1-ene, hex-1-ene, 4-methylpent-1-ene or oct-1-ene. Propylene is especially preferred.

The polymerization is carried out in known manner in solution, in suspension or in the gas phase, continuously or batchwise, in one or more steps, at a temperature of –60 to 100° C., preferably 0 to 80° C. The pressure is 0.5 to 100 bar. Polymerization preferably takes place in the pressure range from 5 to 60 bar, which is of particular interest to industry.

The metallocene compound is used in a concentration of $10^{-3}$ to $10^{-7}$, preferably $10^{-4}$ to $10^{-6}$ mol of transition metal per $dm^3$ of solvent or per $dm^3$ of reactor volume. The aluminoxane is used in a concentration of $10^{-4}$ to $10^{-1}$ mol, preferably $10^{-3}$ to $10^{-2}$ mol per $dm^3$ of solvent or per $dm^3$ of reactor volume. In principle, however, higher concentrations are also possible.

If the polymerization is carried out in suspension or solution, the reaction is performed in an inert solvent conventionally used for the Ziegler low-pressure process, for example in an aliphatic or cycloaliphatic hydro-carbon; examples of such hydrocarbons which may be mentioned are butane, pentane, hexane, heptane, isooctane, cyclohexane and methylcyclohexane. It is also possible to use a naphtha or hydrogenated diesel oil fraction from which oxygen, sulfur compounds and moisture have been carefully removed. Toluene can also be used. Preferably, the monomer to be polymerized is used as the solvent or suspending agent. The molecular weight of the polymer can be regulated in known manner, hydrogen preferably being used for this purpose. The polymerization time is arbitrary since the time-dependent loss of polymerization activity shown by the catalyst system to be used according to the invention is only slight.

The process according to the invention is distinguished by the fact that the zirconium and hafnium compounds which are preferably used are very temperature-resistant, so they can also be used at temperatures up to about 90° C. Moreover, the aluminoxanes used as cocatalysts can be added in a smaller concentration than hitherto. Finally, it is now possible to manufacture isoblock polymers at temperatures which are of interest to industry.

The following Examples will serve to illustrate the invention. The abbreviations used have the meanings given below:

VN=viscosity number in $cm^3/g$,

Mw=weight-average molecular weight in g/mol,

Mw/Mn=molecular weight distribution determined by gel permeation chromatography (GPC), II=isotacticity index determined by $^{13}C$ NMR spectroscopy, and niso=average length of the isotactic sequences.

Isoblock polymers can be detected and distinguished from other 1-olefin polymers by NMR spectroscopy with the aid of triple resonance analysis (q.v. A. Zambelli et al., Macromolecules 8, 687–689 (1975)). Markoff statistics are valid for isoblock polymers if the following equation is satisfied:

$$2(rr)/(mr)=1$$

The experimental results are collated in the Table.

EXAMPLE 1

A dry 16 $dm^3$ kettle was flushed with nitrogen and filled with 10 $dm^3$ of liquid propylene. 96 $cm^3$ of a toluene solution of methylaluminoxane (=MAO, corresponding to 68 mmol of Al, average degree of oligomerization n=30) were then added and the reaction mixture was stirred at 30° C. for 15 minutes.

In a parallel procedure, 43 mg (0.088 mmol) of indenyl-(cyclopentadienyl)(dimethylsilyl dichloride were dissolved in 46 $cm^3$ of MAO (=33 mmol of Al) and preactivated by standing for 15 minutes. The solution was then introduced into the kettle. The polymerization system was brought to a temperature of 70° C. and then kept for 5 hours at this temperature.

0.69 kg of isoblock polymer was obtained. The activity of the metallocene was therefore 1.57 kg of PP/mmol of Hf/h or 3.2 kg of PP/g of metallocene/h.

The following analytical data were determined on the polymer: VN=19 $cm^3/g$, Mw=16,100, Mn=5800, Mw/Mn=2.8, II=72.8%, niso=5.3.

EXAMPLE 2

The procedure was analogous to that in Example 1 except that 60° C. was selected as the polymerization temperature. The polymerization time was 5 hours. 32.7 mg (=0.067 mmol) of metallocene compound were used. 0.15 kg of isoblock polymer was obtained. The activity of the metallocene was therefore 0.45 kg of PP/mmol of Hf/h or 0.92 kg of PP/g of metallocene/h. The following analytical data were determined on the polymer: VN=35 $cm^3/g$, Mw=16,200, Mn=9300, Mw/Mn=1.7, II=72.6%, niso=5.0.

EXAMPLE 3

The procedure was analogous to that in Example 1 except that 50° C. was selected as the polymerization temperature. The polymerization time was 25 hours. 30.0 mg (=0.062 mmol) of metallocene compound were used in the appropriate amount of MAO. 0.43 kg of isoblock polymer was obtained. The activity of the metallocene was therefore 0.28 kg of PP/mmol of Hf/h or 0.57 kg of PP/g of metallocene/h. The following analytical data were determined on the polymer: VN=43 $cm^3/g$, Mw=31,000, Mn=14,300, Mw/Mn=2.2, II=74.0%, niso=5.7.

EXAMPLE 4

The procedure was analogous to that in Example 1 except that 40° C. was selected as the polymerization temperature. The polymerization time was 35 hours. 34.4 mg (=0.071 mmol) of metallocene compound were used. 0.28 kg of isoblock polymer was obtained. The activity of the metallocene was therefore 0.11 kg of PP/mmol of Hf/h or 0.23 kg of PP/g of metallocene/h. The following analytical data were determined on the polymer: VN=70 $cm^3/g$, Mw=56,100, Mn=24,100, Mw/Mn=2.3, II=75.5%, niso=6.0.

EXAMPLE 5

The procedure was analogous to that in Example 1 except that 10° C. was selected as the polymerization temperature. The polymerization time was 12 hours. 207.7 mg (=0.426 mmol) of metallocene compound were used. 0.07 kg of isoblock polymer was obtained. The activity of the metallocene was 13.7 g of PP/mmol of Hf/h or 0.03 kg of PP/g of metallocene/h. The following analytical data were determined on the polymer: VN=62 $cm^3/g$, Mw=59,900, Mn=29,800, Mw/Mn=2.0, II=75.7%, niso=6.9.

EXAMPLE 6

The procedure was analogous to that in Example 1 except that indenyl(cyclopentadienyl)(dimethylsilyl)zirconium dichloride, in an amount of 5.0 mg (=0.013 mmol), was selected as the metallocene compound (the metallocene was dissolved in 20 $cm^3$ of MAO (=13.4 mmol of Al), and 40 $cm^3$ of MAO (=26.8 mmol of Al) were added to the liquid propylene).

The polymerization system was brought to a temperature of 60° C. and then kept for 15 hours at this temperature. 1.2 kg of isoblock polymer were obtained. The activity of the metallocene was therefore 6.15 kg of PP/mmol of Zr/h or 16.0 kg of PP/g of metallocene/h. The following analytical data were determined on the polymer: VN=30 cm³/g, Mw=17,000, Mn=5800, Mw/Mn=2.9, II=69.0%, niso=4.6.

EXAMPLE 7

The procedure was analogous to that in Example 6 except that 50° C. was selected as the polymerization temperature. The polymerization time was 5 hours. 15.0 mg (=0.038 mmol) of metallocene compound were used and 1.1 kg of isoblock polymer were obtained. The activity of the metallocene was 5.8 kg of PP/mmol of Zr/h or 14.7 kg of PP/g of metallocene/h. The following analytical data were determined on the polymer: VN=28 cm³/g, Mw=25,200, Mn=7900, Mw/Mn=3.2, II=71.5%, niso=4.9.

EXAMPLE 8

The procedure was analogous to that in Example 6 except that 40° C. was selected as the polymerization temperature. The polymerization time was 15 hours. 13.5 mg (=0.034 mmol) of metallocene compound were used and 0.60 kg of isoblock polymer was obtained. The activity of the metallocene was therefore 1.18 kg of PP/mmol of Zr/h or 3.0 kg of PP/g of metallocene/h.

COMPARATIVE EXAMPLE A

In an experiment analogous to Example 1, a polymer with a VN of 43.5 cm³/g, an Mw of 35,200 and an Mw/Mn of 2.5 was obtained with rac-bis(indenyl)(dimethylsilyl)zirconium dichloride. The isotacticity index was 96.6% and the length of the isotactic sequences was found to be 51.

What is claimed is:

1. A metallocene comprising the formula I

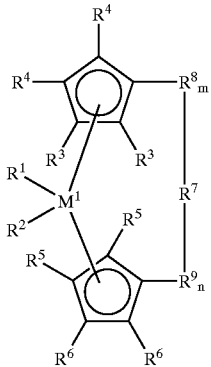

in which
M¹ is a metal of group IVb, Vb or VIb of the periodic table,
$R^1$ and $R^2$ are identical or different and are a hydrogen atom, a $C_1$–$C_{10}$-alkyl group, a $C_1$–$C_{10}$-alkoxy group, a $C_6$–$C_{10}$-aryl group, a $C_6$–$C_{10}$-aryloxy group, a $C_2$–$C_{10}$-alkenyl group, a $C_7$–$C_{40}$-alkenyl group, a $C_7$–$C_{40}$-arylakyl group, a $C_8$–$C_{40}$-arylalkenyl group or a halogen atom,
$R^3$, $R^4$, $R^5$ and $R^6$ are identical or different and are a hydrogen atom, a halogen atom, a $C_1$–$C_{10}$-alkyl group, —$NR^{10}{}_2$, —$SR^{10}$, or —$PR^{10}{}_2$, in which $R^{10}$ is a halogen atom or a $C_1$–$C_{10}$-alkyl group, or pairs of adjacent radicals $R^3$, $R^4$, $R^5$ and $R^6$ form a ring with the C atoms to which they are bonded, and $R^7$ is

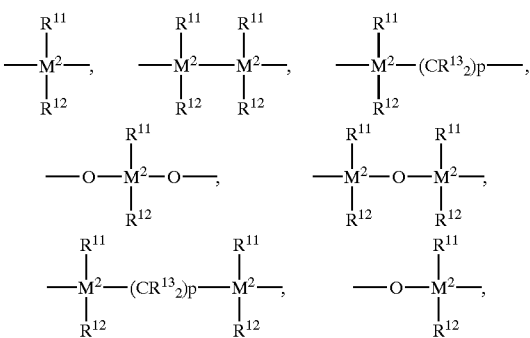

in which
$R^{11}$, $R^{12}$ and $R^{13}$ are identical or different and are a hydrogen atom, a $C_1$–$C_{10}$-alkyl group, a $C_1$–$C_{10}$-fluoroalkyl group, a $C_6$–$C_{10}$-aryl group, a $C_6$–$C_{10}$-fluoroaryl group, a $C_1$–$C_{10}$-alkoxy group, a $C_2$–$C_{10}$-alkenyl group, a $C_7$–$C_{40}$-arylalkyl group, a $C_8$–$C_{40}$-arylalkenyl group or a $C_7$–$C_{40}$-alkylaryl group, or $R^{11}$ and $R^{12}$ and $R^{13}$ form a ring with the atoms to which they are bonded,
$M^2$ is silicon, germanium or tin,
P is 1, 2 or 3,
$R^8$ and $R^9$ are identical or different and are a group $=CR^{11}R^{12}$, in which $R^{11}$ and $R^{12}$ are as defined above, and
m and n are identical or different and are zero, 1 or 2, m+n being zero, 1 or 2, and the ring containing substituents $R^3$ and $R^4$ is different from the ring containing substituents $R^5$ and $R^6$.

2. The metallocene as claimed in claim 1, wherein the metallocene is indenyl(dimethylsilyl)(h5-cyclopentadienyl)hafnium dichloride or indenyl(dimethylsilyl)(h5-cyclopentadienyl)zirconium dichloride.

3. The metallocene as claimed in claim 1, wherein $R^1$ and $R^2$ are identical or different and are a hydrogen atom, $C_1$–$C_3$-alkyl group, $C_1$–$C_3$-alkoxy group, $C_6$–$C_8$-aryl group, $C_6$–$C_8$-aryloxy group, $C_2$–$C_4$-alkenyl group, $C_7$–$C_{10}$-arylalkyl group, $C_7$–$C_{12}$-alkylaryl group, $C_8$–$C_{12}$-arylalkenyl group or chlorine atom.

4. The metallocene as claimed in claim 1, wherein $R^3$, $R^4$, $R^5$ and $R^6$ are different, and are a hydrogen atom, a fluorine atom, chlorine atom, a bromine atom, $C_1$–$C_3$-alkyl group, —$NR^{10}{}_2$, —$SR^{10}$, or —$PR^{10}{}_2$, in which $R^{10}$ is a chlorine atom, or a $C_1$–$C_3$-alkyl group, or pairs of adjacent radicals $R^3$, $R^4$, $R^5$ and $R^6$ form a ring with the C atoms to which they are bonded.

5. The metallocene as claimed in claim 3, wherein $R^3$, $R^4$, $R^5$ and $R^6$ are different, and are a hydrogen atom, a fluorine atom, chlorine atom, a bromine atom, $C_1$–$C_3$-alkyl group, —$NR^{10}{}_2$, —$SR^1$, or —$PR^{10}{}_2$, in which $R^{10}$ is a chlorine atom, or a $C_1$–$C_3$-alkyl group, or pairs of adjacent radicals $R^3$, $R^4$, $R^5$ and $R^6$ form a ring with the C atoms to which they are bonded.

6. The metallocene as claimed in claim 1, wherein $R^{11}$, $R^{12}$ and $R^{13}$ are identical or different and are a hydrogen atom, a $C_1$–$C_4$-alkyl group, a $CF_3$ group, a $C_6$–$C_8$-aryl group, a hexafluorophenyl group, a $C_1$–$C_4$-alkoxy group, a $C_2$–$C_4$-alkenyl group, a $C_7$–$C_{10}$-arylalkyl group, a $C_8$–$C_{12}$-arylalkenyl group or a $C_7$–$C_{12}$-alkylaryl group, or $R^{11}$ and $R^{12}$ or $R^{11}$ and $R^{13}$ form a ring together with the atoms to which they bonded.

7. The metallocene as claimed in claim 5, wherein $R^{11}$, $R^{12}$ and $R^{13}$ are identical or different and are a hydrogen atom, a $C_1$–$C_4$-alkyl group, a $CF_3$ group, a $C_6$–$C_8$-aryl group, a hexafluorophenyl group, a $C_1$–$C_4$-alkoxy group, a $C_2$–$C_4$-alkenyl group, a $C_7$–$C_{10}$-arylalkyl group, a $C_8$–$C_{12}$-arylalkenyl group or a $C_7$–$C_{12}$-alkylaryl group, or $R^{11}$ and $R^{12}$ or $R^{11}$ and $R^{13}$ form a ring together with the atoms to which they are bonded.

8. The metallocene as claimed in claim 1, wherein m and n are zero or 1.

9. The metallocene as claimed in claim 7, wherein m and n are zero or 1.

10. The metallocene as claimed in claim 1, wherein said metallocene contains an indenyl and a cyclopentadienyl ligand.

11. The metallocene as claimed in clam 9, wherein said metallocene contains an indenyl and a cyclopentadienyl ligand.

12. The metallocene as claimed in claim 1, wherein $M^1$ is Zr or Hf.

13. The metallocene as claimed in claim 11, wherein $M^1$ is Zr or Hf.

14. The metallocene as claimed in claim 1, wherein $R^1$ and $R^2$ are a chlorine atom.

15. The metallocene as claimed in claim 13, wherein $R^1$ and $R^2$ are a chlorine atom.

16. The metallocene as claimed in claim 6, wherein $R^7$ is $=SiR^{11}R^{12}$.

17. The metallocene as claimed in claim 15, wherein $R^7$ is $=SiR^{11}R^{12}$, and $R^{11}$ and $R^{12}$ are identical or different and are a hydrogen atom, a halogen atom, a $C_1$–$C_4$-alkyl group, or a $C_6$–$C_8$-aryl group.

* * * * *

UNITED STATES PATENT AND TRADEMARK OFFICE
CERTIFICATE OF CORRECTION

PATENT NO. : 6,413,899 B1
DATED : July 2, 2002
INVENTOR(S) : Dolle et al.

It is certified that error appears in the above-identified patent and that said Letters Patent is hereby corrected as shown below:

Column 10,
Line 54, delete "-$SR^1$" and insert -- -$SR^{10}$ --.

Signed and Sealed this

Third Day of December, 2002

JAMES E. ROGAN
*Director of the United States Patent and Trademark Office*